United States Patent [19]

Takeda

[11] 3,977,899
[45] Aug. 31, 1976

[54] SOLID ELECTROLYTE CELL

[75] Inventor: Kazutoshi Takeda, Sendai, Japan

[73] Assignee: Kabushiki Kaisha Daini Seikosha, Japan

[22] Filed: Dec. 9, 1974

[21] Appl. No.: 530,861

[30] Foreign Application Priority Data
Dec. 12, 1973    Japan.............................. 48-139026

[52] U.S. Cl............................... 136/83 R; 136/23
[51] Int. Cl.²........................................... H01M 4/36
[58] Field of Search................. 136/83 R, 83 T, 20, 136/154, 100 R, 23

[56] References Cited
UNITED STATES PATENTS

| | | | |
|---|---|---|---|
| 3,762,955 | 10/1973 | Dubin | 136/83 R |
| 3,770,502 | 11/1973 | Nakaboyashi | 136/83 R X |
| 3,793,080 | 2/1974 | Hess | 136/83 R |
| 3,817,790 | 6/1974 | Mitoff | 136/83 R |
| 3,824,130 | 7/1974 | Liang | 136/83 R |
| 3,826,685 | 7/1974 | Dubin et al. | 136/83 R |
| 3,849,200 | 11/1974 | Charles et al. | 136/83 R |
| 3,909,296 | 9/1975 | Ito | 136/83 R |

Primary Examiner—John H. Mack
Assistant Examiner—C. F. LeFevour
Attorney, Agent, or Firm—Robert E. Burns; Emmanuel J. Lobato; Bruce L. Adams

[57] ABSTRACT

A solid electrolyte cell having β-alumina as a solid electrolyte is disclosed. In this cell, positive active material and negative active material are opposed to each other with an intervening β-alumina solid electrolyte layer therebetween. The utilization of the positive active material is increased in order to prolong the life of the heightened cell by mixing a conductive metal powder into the positive active material or by inserting an electrical conductor into the positive active material which is inert to the active material. The conductor is conductively connected to the electrode terminal of the cell.

6 Claims, 7 Drawing Figures

CHARACTERISTICS OF POLARIZATION
(CURRENT COLLECTOR: COPPER POWDER)

CHARACTERISTICS OF DISCHARGE
(CURRENT COLLECTOR: COPPER POWDER)

CHARACTERISTICS OF POLARIZATION
(CURRENT COLLECTOR: SILVER POWDER)

CHARACTERISTICS OF DISCHARGE
(CURRENT COLLECTOR: SILVER POWDER)

SOLID ELECTROLYTE CELL

BACKGROUND OF THE INVENTION

This invention relates to a cell having solid electrolyte such as β (beta)-alumina.

There has been some interest in solid electrolyte cells because of its long shelf life, reduced leakage of internal solvents, high voltage per unit cell and small size.

The construction of a conventional cell is shown in FIG. 1. A solid electrolyte 1 such as β-alumina is interpositioned between a cathode of a positive-active material 3 in cathode can 2 and an anode of a negative-active material 5 in anode can 4. The cell is sealed by cathode cap 6 and an anode cap 7, which act as terminals. The surfaces of the cell, except the contacting parts of electrodes and electrolyte, are covered with an insulating layer 8 such as epoxy resin.

Because the utilization of the positive active material is insufficient, cells of this kind are not commercially used. Since the cathode cap 6 and the anode cap 7 are made of a thin sheet material such as stainless steel, they are apt to bend under pressure. To allow for this, a vacant space 9 may be formed between the cathode cap 6 and positive active material 3. Because of this, the contact resistance between these parts is increased and the life of the cell is shortened.

SUMMARY OF THE INVENTION

An object of this invention is to provide a solid electrolyte cell for use at the room temperature and eliminating above defects.

The other object of the invention is to provide a solid electrolyte cell having a long life.

The utilization of the positive active material is increased by inserting conductive material such as small metal pieces, metal nets, wire pieces or metal powder etc. into positive active material as current collectors.

Another method of increasing the utilization of the positive active material is to insert a conductor connected to the cathode electrode 2, into said positive active material 3.

DETAILED DESCRIPTION OF THE INVENTION

The cell according to this invention is fundamentally constructed with β-alumina as the solid electrolyte, interposed between sodium metal or alloy as the negative-active material and a pellet of positive-active material.

The positive-active material is preferably a hydrated copper salt and is prepared as follows:

Cupric sulfate penta-hydrate, cupric sulfate tri-hydrate and graphite in powdered form are mixed in a weight ratio of 10:10:2. Then metal powder in 1/10 weight ratio said mixture is added as current collector and mixed further. This cathodic composition is formed to pellets, as by hydraulic pressure in a suitable mold.

In this embodiment, copper or silver powders are used as the current collector, however, they are not limited to these powders. Other conductive forms of the material such as small pieces, pieces of metal nets, wire pieces filiments, screens, turnings, chips or other sub-divided elongated metal particles, or other metal powders electrically conductive and inert or non-reactive to the chemical reactions of the cell may be used.

Figure 2:
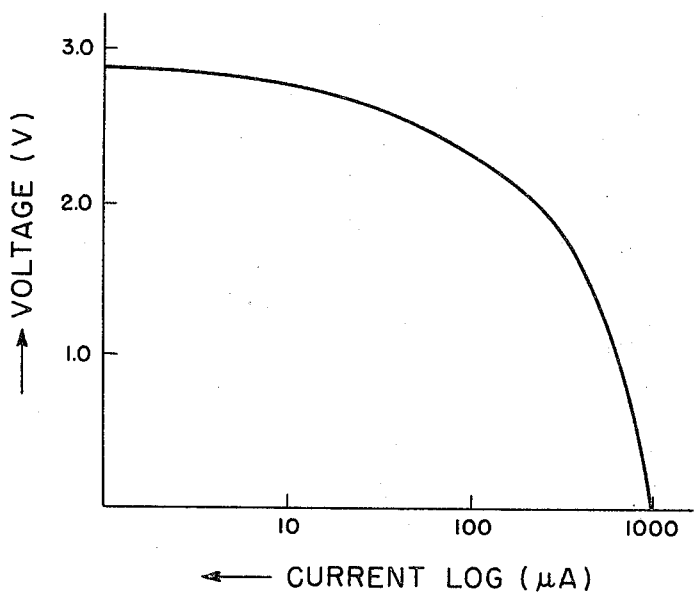
FIG. 2 shows the characteristics polarization achieved adding copper powder to the positive active material according to this invention.
Figure 3:
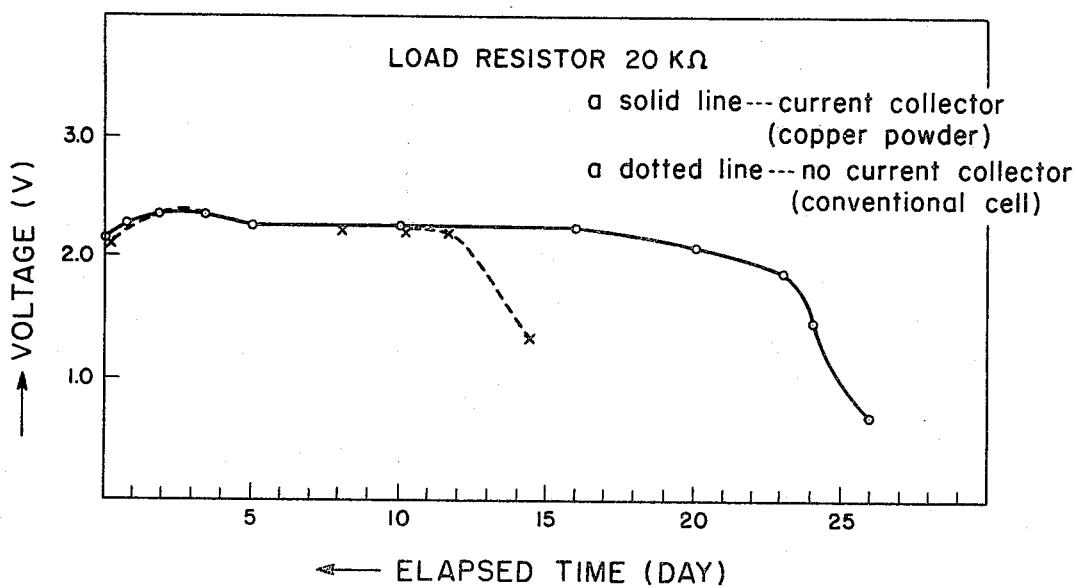
FIG. 3 shows the discharge characteristics by comparing a cell, according to this invention, having copper powder in the positive active material with a conventional cell.

FIGS. 2 and 3 show the characteristics of the cell using the cathode pellet including copper powder, wherein FIG. 2 shows the polarization characteristics and FIG. 3 shows the discharge characteristics comparing the cell according to this invention with a conventional cell and discharged using 20 KΩ resistor.

Figure 4:
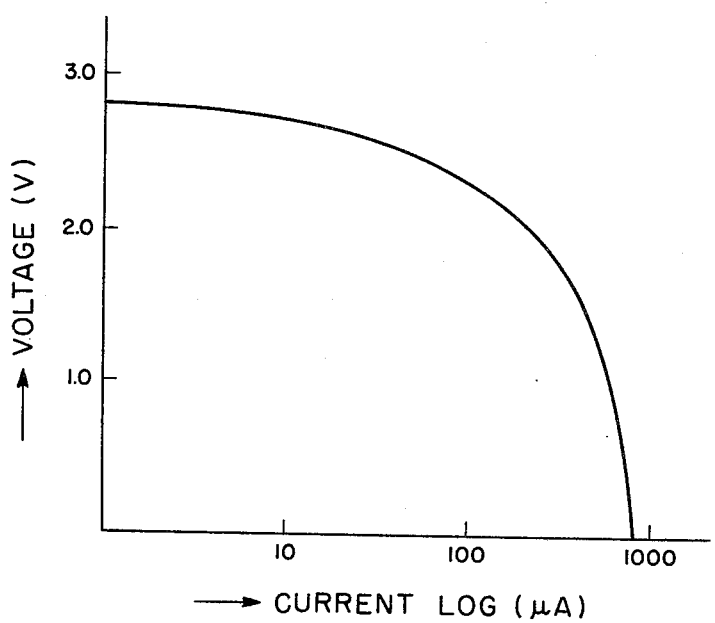
FIG. 4 shows the polarization characteristics achieved by adding silver powder to the positive active material according to this invention.
Figure 5:
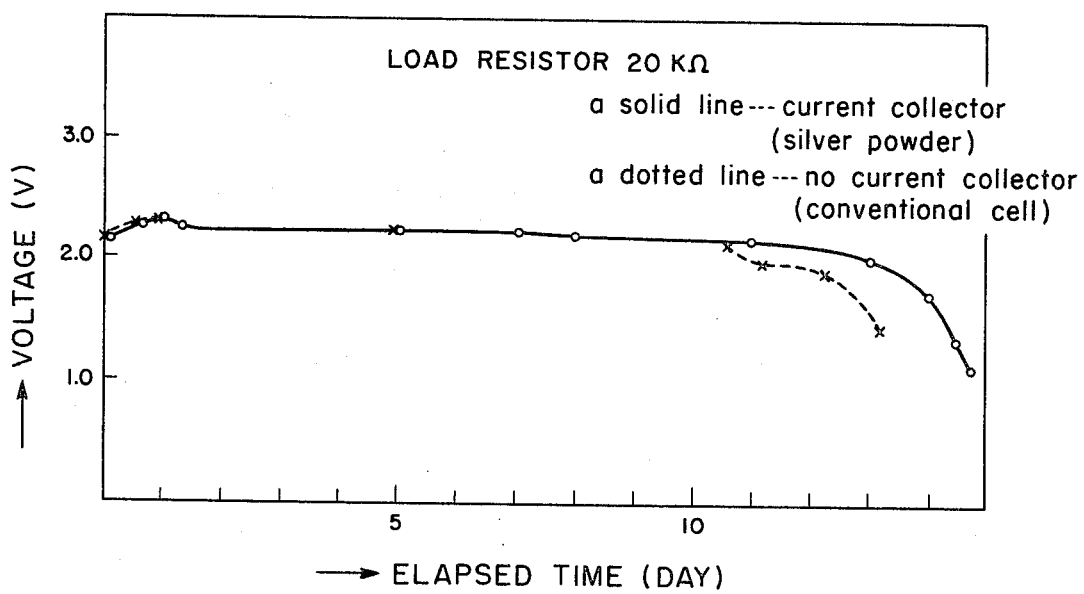
FIG. 5 shows the discharge characteristics comparing the cell according to this invention having silver powder in the positive active material with a conventional cell.

FIGS. 4 and 5 show the characteristics of the cell using the cathode pellet including silver powder, wherein FIG. 4 shows the polarization characteristics and FIG. 5 shows the discharge characteristics comparing the cell according to this invention with a conventional cell, using 20 KΩ constant resistor.

From these curves, it will be seen that the utilization effect of the positive-active material is increased 5% in case of adding silver powder, and is increased 60% in case of adding copper powder.

According to this invention, the utilization effect of the positive-active material is increased by adding the current collector material therein.

Figure 1:
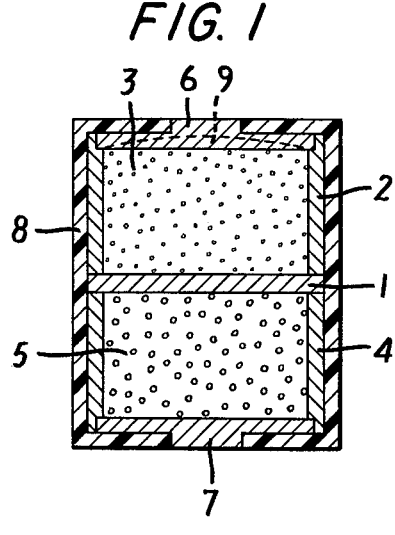
FIG. 1 shows a cross sectional view of a conventional cell.
Figure 6:
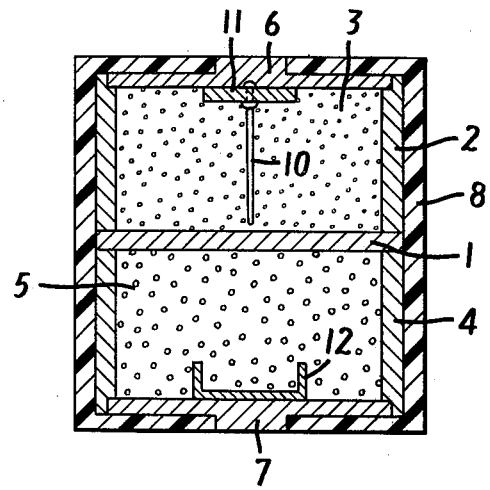
FIG. 6 shows a cross sectional view of a cell according to another embodiment of this invention.

FIG. 6 is another embodiment of this invention with the same reference numerals indicating the same parts as shown in FIG. 1 but including several modifications according to further aspects of this invention.

A stainless steel wire 10 is inserted through almost the entire thickness of the positive-active material 3. Wire 10 is soldered to a small stainless steel disk 11 at the top of the wire 10 to conductively connect thereto and said disk 11 is spot welded to the cathode cap 6. Wire 10 is thus connected electrically with the positive electrode terminal.

A stainless steel lead 12 is spot welded to the anode cap 7 at the interior side and as inserted into negative-active material 5. This provides the same conductive effect as in the case of the cathode electrode.

In this embodiment, positive-active material 3 is a pellet pressed from a powder which is mixture of cupric sulfate pentahydrate, cupric sulfate tri-hydrate and graphite. These compounds are mixed with weight ratio of 10:10:2 and formed into a pellet in a hydraulic press. The negative active material is made from sodium or a sodium alloy (ex. amalgamated sodium).

Figure 7:
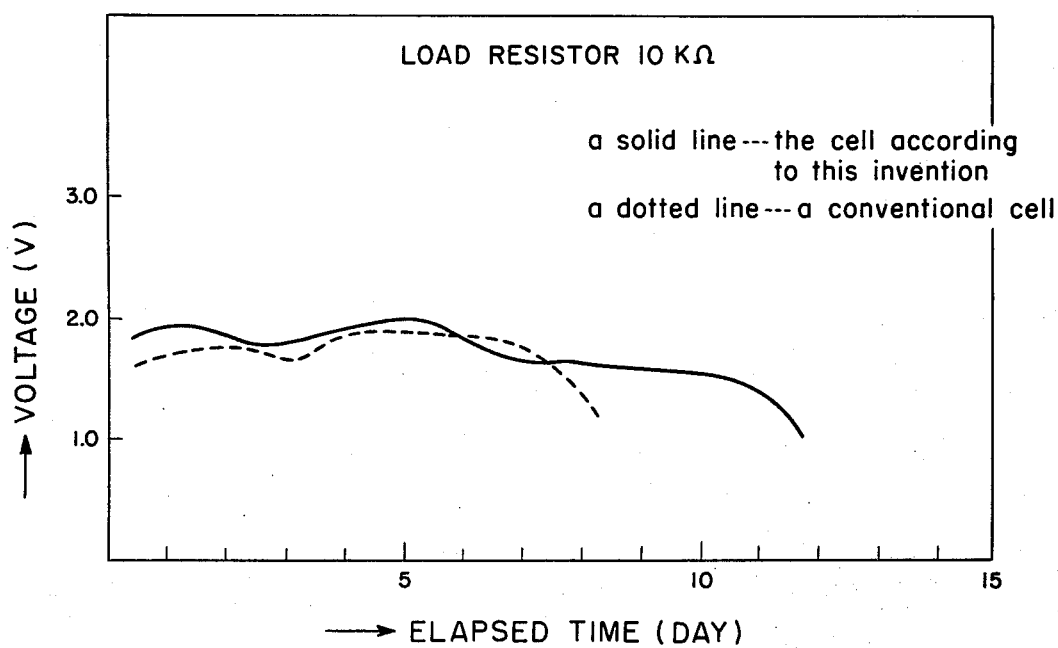
FIG. 7 shows the discharge characteristics of the cells according to FIG. 6 using a load resistor of 10 KΩ.

FIG. 7 shows the characteristics of discharge of the cell according to this aspect of the invention using a 10 KΩ load resistor. It is seen that the life of the cell is greatly increased.

According to this aspect of the invention, a conductor which is electrically connected to the electrode is inserted into the respective active materials. Then even if vacant spaces occur within or between the cell elements due to gas or thermal stresses, or by bending of the caps, the contact resistance between said terminal caps and their respective active materials will not increase and thus long cell life can be achieved.

The solid β-alumina electrolyte for this invention is preferably made by a hot pressing technique. One method of preparing suitable shaped β-alumina solid electrolyte elements includes the following steps:

Gamma-alumina or alpha-alumina is mixed with an alkali aluminate (preferably sodium aluminate ($NaAlO_2$) in methanol or any other nonaqueous solvent for the aluminate [2]. The ratio of the alumina and the aluminate is about 78 weight percent to 22 weight percent but may vary depending on the alkali. This mixture is ground into slurry with solid particles of preferably less than three microns.

The slurry is dried and then re-ground.

This re-ground material is calcined at temperatures of 1,200°–1,400°C. for about 5 hours or more.

This calcined product is again pulverized in air or in a nonaqueous liquid medium such as methanol and then dried to remove any solvent.

This dried material is heat-treated to a temperature of 1,200°–1,600°C. and maintained at a pressure of 150–250 kg/cm² for at least one hour. The pressure is then released and the soheat-treated material is hot pressed to shape under the following conditions:

| | |
|---|---|
| Temperature: | 1700–1900°C. |
| Pressure: | 200–350 kg/cm² |
| Pressing time: | 5–120 minutes |

The hot pressed beta-alumina made by above steps is trimmed or cut to form solid electrolyte pellets or elements having appropriate shapes and sizes.

These elements are then further treated at a temperature of about 1,600°C. for at least 2 hours before cooling and assembling into cells. Preferably the β-alumina is used in the form of thin pellets or foils completely interposed between the cathodic and anodic materials of the cell.

While a preferred embodiment of the invention has been shown and described it will be understood that many modifications and changes can be made within the true spirit and scope of the invention. The use of all art recognized equivalents is intended.

I claim:

1. An electrochemical cell comprising a pellet of positive-active material, negative-active material of amalgamated alkali metal or its alloy and a solid electrolyte of β alumina interposed therebetween, wherein said positive active materials comprises cupric sulfate penta hydrate, cupric sulfate trihydrate and said pellet has conductive current collector material consisting of graphite and a conductive metal which is inert wth respect to said positive active material disposed therein.

2. The cell according to claim 1, wherein said conductive current collector is a metal powder.

3. The cell according to claim 1, wherein the current collector material is stainless steel metal continuously connected electrically with the positive electrode terminal.

4. The cell to claim 1, wherein said metal is connected material in the form of filaments, screens, wires, turnings, chips and other subdivided elongated metallic particles.

5. The cell according to claim 1 wherein the weight ratios of each composition comprising said cupric sulfate pentahydrate, cupric sulfate trihydrate and the graphite is 10:10:2.

6. The cell according to claim 3, wherein a stainless steel current collector is also provided in said negative-active (anodic) material and is conductively connected to its terminal.

* * * * *